(12) United States Patent
Maxik et al.

(10) Patent No.: US 8,680,457 B2
(45) Date of Patent: Mar. 25, 2014

(54) MOTION DETECTION SYSTEM AND ASSOCIATED METHODS HAVING AT LEAST ONE LED OF SECOND SET OF LEDS TO VARY ITS VOLTAGE

(71) Applicant: Lighting Science Group Corporation, Satellite Beach, FL (US)

(72) Inventors: Fredric S. Maxik, Indialantic, FL (US); Eric Bretschneider, Scottsville, KY (US); Pedro Medelius, Merritt Island, FL (US); David E. Bartine, Cocoa, FL (US); Robert R. Soler, Cocoa Beach, FL (US); Gregory Flickinger, Indialantic, FL (US)

(73) Assignee: Lighting Science Group Corporation, Satellite Beach, FL (US)

( * ) Notice: Subject to any disclaimer, the term of this patent is extended or adjusted under 35 U.S.C. 154(b) by 0 days.

(21) Appl. No.: 13/739,665

(22) Filed: Jan. 11, 2013

(65) Prior Publication Data
US 2013/0292550 A1 Nov. 7, 2013

Related U.S. Application Data

(60) Provisional application No. 61/643,634, filed on May 7, 2012.

(51) Int. Cl.
*H01J 40/14* (2006.01)
(52) U.S. Cl.
USPC .................................... 250/221; 250/205
(58) Field of Classification Search
USPC ................. 250/221, 205, 214 R, 559.4; 340/506–541, 555–557; 362/205, 202, 362/231, 268
See application file for complete search history.

(56) References Cited

U.S. PATENT DOCUMENTS

| 5,319,301 A | 6/1994 | Callahan et al. |
| 5,523,878 A | 6/1996 | Wallace et al. |

(Continued)

FOREIGN PATENT DOCUMENTS

| CN | 101 702 421 A | 5/2010 |
| EP | 0851260 | 7/1998 |

(Continued)

OTHER PUBLICATIONS

U.S. Appl. No. 13/234,371, filed Sep. 16, 2011, Fredric S. Maxik et al.

(Continued)

*Primary Examiner* — Que T Le
(74) *Attorney, Agent, or Firm* — Mark R. Malek; Daniel C. Pierron; Zies Widerman & Malek

(57) ABSTRACT

A lighting system which includes a light source to emit illuminating light and sense reflected light from an environment. The light source may be included in an array to be selectively enabled and disabled by the controller. The array may include a plurality of light sources, each of which may be sensitive to a wavelength respective to each light source, thus providing the array sensitivity to one or more wavelength. Each of the plurality of light sources in the array may be selectively operable between a sensing operation and an emitting operation. The sensing operation may be defined by the light source sensing the environmental light, and the emitting operation being defined by the light source emitting the illuminating light. The controller may selectively operate the light source between the passive operation and the active operation.

20 Claims, 2 Drawing Sheets

(56) References Cited

U.S. PATENT DOCUMENTS

| | | | |
|---|---|---|---|
| 5,563,422 A | 10/1996 | Nakamura et al. |
| 5,680,230 A | 10/1997 | Kaburagi et al. |
| 5,704,701 A | 1/1998 | Kavanagh et al. |
| 5,813,753 A | 9/1998 | Vriens et al. |
| 5,936,599 A | 8/1999 | Reymond |
| 5,997,150 A | 12/1999 | Anderson |
| 6,140,646 A | 10/2000 | Busta et al. |
| 6,259,572 B1 | 7/2001 | Meyer, Jr. |
| 6,341,876 B1 | 1/2002 | Moss et al. |
| 6,356,700 B1 | 3/2002 | Strobl |
| 6,561,656 B1 | 5/2003 | Kojima et al. |
| 6,586,882 B1 | 7/2003 | Harbers |
| 6,594,090 B2 | 7/2003 | Kruschwitz et al. |
| 6,608,453 B2 | 8/2003 | Morgan et al. |
| 6,733,135 B2 | 5/2004 | Dho |
| 6,734,639 B2 | 5/2004 | Chang et al. |
| 6,762,562 B2 | 7/2004 | Leong |
| 6,767,111 B1 | 7/2004 | Lai |
| 6,817,735 B2 | 11/2004 | Shimizu et al. |
| 6,853,150 B2 | 2/2005 | Clauberg et al. |
| 6,870,523 B1 | 3/2005 | Ben-David et al. |
| 6,871,982 B2 | 3/2005 | Holman et al. |
| 6,876,007 B2 | 4/2005 | Yamazaki et al. |
| 6,940,101 B2 | 9/2005 | Yano et al. |
| 6,967,761 B2 | 11/2005 | Starkweather et al. |
| 6,974,713 B2 | 12/2005 | Patel et al. |
| 6,982,641 B1 * | 1/2006 | Greene .......................... 340/541 |
| 7,015,636 B2 | 3/2006 | Bolta |
| 7,042,623 B1 | 5/2006 | Huibers et al. |
| 7,058,197 B1 | 6/2006 | McGuire et al. |
| 7,066,628 B2 | 6/2006 | Allen |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,095,053 B2 | 8/2006 | Mazzochette et al. |
| 7,138,770 B2 | 11/2006 | Uang et al. |
| 7,144,131 B2 | 12/2006 | Rains |
| 7,157,745 B2 | 1/2007 | Blonder et al. |
| 7,178,941 B2 | 2/2007 | Roberge et al. |
| 7,184,201 B2 | 2/2007 | Duncan |
| 7,187,484 B2 | 3/2007 | Mehrl |
| 7,213,926 B2 | 5/2007 | May et al. |
| 7,234,844 B2 | 6/2007 | Bolta et al. |
| 7,242,156 B2 | 7/2007 | Chikugawa |
| 7,246,923 B2 | 7/2007 | Conner |
| 7,247,874 B2 | 7/2007 | Bode et al. |
| 7,252,408 B2 | 8/2007 | Mazzochette et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,319,293 B2 | 1/2008 | Maxik |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,353,859 B2 | 4/2008 | Stevanovic et al. |
| 7,369,056 B2 | 5/2008 | McCollough, Jr. |
| 7,382,091 B2 | 6/2008 | Chen et al. |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,436,996 B2 | 10/2008 | Ben-Chorin |
| 7,438,443 B2 | 10/2008 | Tatsuno et al. |
| 7,476,016 B2 | 1/2009 | Kurihara |
| 7,489,086 B2 | 2/2009 | Miskin et al. |
| 7,497,596 B2 | 3/2009 | Ge |
| 7,520,607 B2 | 4/2009 | Casper et al. |
| 7,520,642 B2 | 4/2009 | Holman et al. |
| 7,521,875 B2 | 4/2009 | Maxik |
| 7,525,254 B2 | 4/2009 | Lys et al. |
| 7,528,421 B2 | 5/2009 | Mazzochette |
| 7,530,708 B2 | 5/2009 | Park |
| 7,537,347 B2 | 5/2009 | Dewald |
| 7,540,616 B2 | 6/2009 | Conner |
| 7,556,376 B2 | 7/2009 | Ishak et al. |
| 7,556,406 B2 | 7/2009 | Petroski et al. |
| 7,567,040 B2 | 7/2009 | Pong et al. |
| 7,598,682 B2 | 10/2009 | Grajcar |
| 7,598,686 B2 | 10/2009 | Lys et al. |
| 7,598,961 B2 | 10/2009 | Higgins |
| 7,605,971 B2 | 10/2009 | Ishii et al. |
| 7,619,372 B2 | 11/2009 | Garrity |
| 7,626,755 B2 | 12/2009 | Furuya et al. |
| 7,633,093 B2 | 12/2009 | Blonder et al. |
| 7,633,779 B2 | 12/2009 | Garrity et al. |
| 7,637,643 B2 | 12/2009 | Maxik |
| 7,677,736 B2 | 3/2010 | Kazasumi et al. |
| 7,684,007 B2 | 3/2010 | Hull et al. |
| 7,703,943 B2 | 4/2010 | Li et al. |
| 7,703,961 B2 | 4/2010 | Yatsuda et al. |
| 7,705,810 B2 | 4/2010 | Choi et al. |
| 7,708,452 B2 | 5/2010 | Maxik et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,764,421 B2 | 7/2010 | Fujiwara et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Gruber |
| 7,845,823 B2 | 12/2010 | Mueller et al. |
| 7,852,017 B1 | 12/2010 | Melanson |
| 7,855,376 B2 | 12/2010 | Cantin et al. |
| 7,871,839 B2 | 1/2011 | Lee et al. |
| 7,880,400 B2 | 2/2011 | Zhou et al. |
| 7,889,430 B2 | 2/2011 | El-Ghoroury et al. |
| 7,906,789 B2 | 3/2011 | Jung et al. |
| 7,922,355 B1 | 4/2011 | Morejon et al. |
| 7,928,565 B2 | 4/2011 | Brunschwiler et al. |
| 7,972,030 B2 | 7/2011 | Li |
| 7,976,182 B2 | 7/2011 | Ribarich |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,164,844 B2 | 4/2012 | Toda et al. |
| 8,188,687 B2 | 5/2012 | Lee et al. |
| 8,212,836 B2 | 7/2012 | Matsumoto et al. |
| 8,232,745 B2 | 7/2012 | Chemel et al. |
| 8,242,476 B2 | 8/2012 | Mimeault et al. |
| 8,253,336 B2 | 8/2012 | Maxik et al. |
| 8,256,921 B2 | 9/2012 | Crookham et al. |
| 8,274,089 B2 | 9/2012 | Lee et al. |
| 8,288,776 B2 | 10/2012 | Choi et al. |
| 8,297,783 B2 | 10/2012 | Kim |
| 8,301,027 B2 | 10/2012 | Shaw et al. |
| 8,304,978 B2 | 11/2012 | Kim et al. |
| 8,310,171 B2 | 11/2012 | Reisenauer et al. |
| 8,319,445 B2 | 11/2012 | McKinney et al. |
| 8,324,823 B2 | 12/2012 | Choi et al. |
| 8,324,840 B2 | 12/2012 | Shteynberg et al. |
| 8,331,099 B2 | 12/2012 | Geissler et al. |
| 8,337,029 B2 | 12/2012 | Li |
| 8,400,061 B2 | 3/2013 | Kuang et al. |
| 8,410,717 B2 | 4/2013 | Shteynberg et al. |
| 8,410,725 B2 | 4/2013 | Jacobs et al. |
| 8,427,590 B2 | 4/2013 | Raring et al. |

(56) References Cited

U.S. PATENT DOCUMENTS

| | | |
|---|---|---|
| 8,441,210 B2 | 5/2013 | Shteynberg et al. |
| 8,492,995 B2 | 7/2013 | Maxik et al. |
| 8,515,289 B2 | 8/2013 | Maxik et al. |
| 8,531,126 B2 | 9/2013 | Kaihotsu et al. |
| 2004/0052076 A1 | 3/2004 | Mueller |
| 2004/0093045 A1 | 5/2004 | Bolta |
| 2004/0119086 A1 | 6/2004 | Yano et al. |
| 2005/0189557 A1 | 9/2005 | Mazzochette et al. |
| 2005/0218780 A1 | 10/2005 | Chen |
| 2005/0267213 A1 | 12/2005 | Gold et al. |
| 2006/0002108 A1 | 1/2006 | Ouderkirk et al. |
| 2006/0002110 A1 | 1/2006 | Dowling et al. |
| 2006/0164005 A1 | 7/2006 | Sun |
| 2006/0232992 A1 | 10/2006 | Bertram et al. |
| 2006/0285193 A1 | 12/2006 | Kimura et al. |
| 2007/0013871 A1 | 1/2007 | Marshall et al. |
| 2007/0159492 A1 | 7/2007 | Lo et al. |
| 2007/0188847 A1 | 8/2007 | McDonald et al. |
| 2007/0241340 A1 | 10/2007 | Pan |
| 2007/0262714 A1 | 11/2007 | Bylsma |
| 2008/0119912 A1 | 5/2008 | Hayes |
| 2008/0143973 A1 | 6/2008 | Wu |
| 2008/0195355 A1 | 8/2008 | Brandt et al. |
| 2008/0198572 A1 | 8/2008 | Medendorp |
| 2008/0231214 A1 | 9/2008 | Kim et al. |
| 2008/0232084 A1 | 9/2008 | Kon |
| 2008/0258643 A1 | 10/2008 | Cheng |
| 2008/0266690 A1 | 10/2008 | Toda et al. |
| 2009/0009102 A1 | 1/2009 | Kalhman |
| 2009/0059099 A1 | 3/2009 | Linkov |
| 2009/0059585 A1 | 3/2009 | Chen et al. |
| 2009/0128781 A1 | 5/2009 | Li |
| 2009/0160370 A1 | 6/2009 | Tai |
| 2009/0232683 A1 | 9/2009 | Hirata et al. |
| 2009/0261748 A1 | 10/2009 | McKinney et al. |
| 2009/0262516 A1 | 10/2009 | Li |
| 2009/0273931 A1 | 11/2009 | Ito et al. |
| 2009/0297166 A1 | 12/2009 | Nakagawa et al. |
| 2010/0001652 A1 | 1/2010 | Damsleth |
| 2010/0006762 A1 | 1/2010 | Yoshida et al. |
| 2010/0051976 A1 | 3/2010 | Rooymans |
| 2010/0053959 A1 | 3/2010 | Ijzerman et al. |
| 2010/0060181 A1 | 3/2010 | Choi et al. |
| 2010/0061068 A1 | 3/2010 | Geissler et al. |
| 2010/0061078 A1 | 3/2010 | Kim |
| 2010/0072494 A1 | 3/2010 | Lee |
| 2010/0085758 A1 | 4/2010 | Takahashi et al. |
| 2010/0103389 A1 | 4/2010 | McVea et al. |
| 2010/0118510 A1 | 5/2010 | Bailey et al. |
| 2010/0157573 A1 | 6/2010 | Toda et al. |
| 2010/0171441 A1 | 7/2010 | Schlangen et al. |
| 2010/0202129 A1 | 8/2010 | Abu-Ageel |
| 2010/0213859 A1 | 8/2010 | Shteynberg et al. |
| 2010/0231136 A1 | 9/2010 | Reisenauer et al. |
| 2010/0231863 A1 | 9/2010 | Hikmet et al. |
| 2010/0244700 A1 | 9/2010 | Chong et al. |
| 2010/0244724 A1 | 9/2010 | Jacobs et al. |
| 2010/0244740 A1 | 9/2010 | Alpert et al. |
| 2010/0270942 A1 | 10/2010 | Hui et al. |
| 2010/0277084 A1 | 11/2010 | Lee et al. |
| 2010/0302464 A1 | 12/2010 | Raring et al. |
| 2010/0308738 A1 | 12/2010 | Shteynberg et al. |
| 2010/0308739 A1 | 12/2010 | Shteynberg et al. |
| 2010/0315320 A1 | 12/2010 | Yoshida |
| 2010/0320927 A1 | 12/2010 | Gray et al. |
| 2010/0320928 A1 | 12/2010 | Kaihotsu et al. |
| 2010/0321641 A1 | 12/2010 | Van Der Lubbe |
| 2010/0321933 A1 | 12/2010 | Hatanaka et al. |
| 2011/0012137 A1 | 1/2011 | Lin |
| 2011/0080635 A1 | 4/2011 | Takeuchi |
| 2011/0310446 A1 | 12/2011 | Komatsu |
| 2012/0001567 A1 | 1/2012 | Knapp et al. |
| 2012/0112640 A1 | 5/2012 | Maxik et al. |
| 2012/0250137 A1 | 10/2012 | Maxik et al. |
| 2012/0286700 A1 | 11/2012 | Maxik et al. |

FOREIGN PATENT DOCUMENTS

| | | |
|---|---|---|
| JP | 2008226567 | 9/2008 |
| WO | WO03098977 | 11/2003 |
| WO | WO2004011846 | 2/2004 |
| WO | WO2009121539 A1 | 10/2009 |
| WO | WO 2010-027459 | 3/2010 |
| WO | WO 2010-098811 | 9/2010 |
| WO | WO 2011-008251 | 1/2011 |
| WO | WO 2011-016860 | 2/2011 |
| WO | WO 2012064470 | 5/2012 |
| WO | WO2012135173 | 10/2012 |
| WO | WO2012158665 | 11/2012 |

OTHER PUBLICATIONS

U.S. Appl. No. 13/311,300, filed Dec. 5, 2011, Fredric S. Maxik et al.

U.S. Appl. No. 13/709,942, filed Dec. 10, 2012, Fredric S. Maxik et al.

U.S. Appl. No. 13/715,085, filed Dec. 14, 2012, Fredric S. Maxik et al.

U.S. Appl. No. 13/737,606, filed Jan. 9, 2013, Fredric S. Maxik et al.

Arthur P. Fraas, Heat Exchanger Design, 1989, p. 60, John Wiley & Sons, Inc., Canada.

Binnie et al. (1979) "Fluorescent Lighting and Epilepsy" Epilepsia 20(6):725-727.

Charamisinau et al. (2005) "Semiconductor laser insert with Uniform Illumination for Use in Photodynamic Therapy" Appl Opt 44(24):5055-5068.

ERBA Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.

Figueiro et al. (2004) "Spectral Sensitivity of the Circadian System" Proc. SPIE 5187:207.

Figueiro et al. (2008) "Retinal Mechanisms Determine the Subadditive Response to Polychromatic Light by the Human Circadian System" Neurosci Lett 438(2):242.

Gabrecht et al. (2007) "Design of a Light Delivery System for the Photodynamic Treatment of the Crohn's Disease" Proc. SPIE 6632:1-9.

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

Happawana et al. (2009) "Direct De-Ionized Water-Cooled Semiconductor Laser Package for Photodynamic Therapy of Esophageal Carcinoma: Design and Analysis" J Electron Pack 131(2):1-7.

Harding & Harding (1999) "Televised Material and Photosensitive Epilepsy" Epilepsia 40(Suppl. 4):65.

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

J. Y. San, C. H. Huang, M. H, Shu, "Impingement cooling of a confined circular air jet", In t. J. Heat Mass Transf., 1997. pp. 1355-1364, vol. 40.

Kuller & Laike (1998) "The Impact of Flicker from Fluorescent Lighting on Well-Being, Performance and Physiological Arousal" Ergonomics 41(4):433-447.

Lakatos (2006) "Recent trends in the epidemiology of Inflammatory Bowel Disease: Up or Down?" World J Gastroenterol 12(38):6102.

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

Ortner & Dorta (2006) "Technology Insight: Photodynamic Therapy for Cholangiocarcinoma" Nat Clin Pract Gastroenterol Hepatol 3(8):459-467.

Rea (2010) "Circadian Light" J Circadian Rhythms 8(1):2.

Rea et al. (2010) "The Potential of Outdoor Lighting for Stimulating the Human Circadian System" Alliance for Solid-State Illumination Systems and Technologies (ASSIST), May 13, 2010, p. 1-11.

Rosco Laboratories Poster "Color Filter Technical Data Sheet: #87 Pale Yellow Green" (2001).

(56) References Cited

OTHER PUBLICATIONS

S. A Solovitz, L. D. Stevanovic, R. A Beaupre, "Microchannels Take Heatsinks to the Next Level", Power Electronics Technology, Nov. 2006.

Stevens (1987) "Electronic Power Use and Breast Cancer: A Hypothesis" Am J Epidemiol 125(4):556-561.

Tannith Cattermole, "Smart Energy Class controls light on demand", Gizmag.com, Apr. 18, 2010 accessed Nov. 1, 2011.

Topalkara et al. (1998) "Effects of flash frequency and repetition of intermittent photic stimulation on photoparoxysmal responses" Seizure 7(13):249-253.

Veitch & McColl (1995) "Modulation of Fluorescent Light: Flicker Rate and Light Source Effects on Visual Performance and Visual Comfort" Lighting Research and Technology 27:243-256.

Wang (2005) "The Critical Role of Light in Promoting Intestinal Inflammation and Crohn's Disease" J Immunol 174 (12):8173-8182.

Wilkins et al. (1979) "Neurophysical aspects of pattern-sensitive epilepsy" Brain 102:1-25.

Wilkins et al. (1989) "Fluorescent lighting, headaches, and eyestrain" Lighting Res Technol 21(1):11-18.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

Gonzales, Rafael C., et al., "Digital Image Processing", Second Edition, ISBN-0-201-18075-8, 3 pages, 2002.

Lefaix, Gildas, et al., "Motion-based Obstacle Detection and Tracking for Car Driving Assistance," IAPR Int. Conf. on Pattern Recognition, ICPR'2002, vol. 4, pp. 74-77, Quebec, Canada, Aug. 2002.

Lyrtech Inc., "Intelligent occupancy sensor High-performance motion detection solution," Canada, 2s pages, Jun. 2009.

Texas Instruments, "Video and Vision Guide," pp. 1-81, 4Q 2009.

\* cited by examiner

MOTION DETECTION SYSTEM AND ASSOCIATED METHODS HAVING AT LEAST ONE LED OF SECOND SET OF LEDS TO VARY ITS VOLTAGE

RELATED APPLICATIONS

This application is related to and claims the benefit under 35 U.S.C. §119(e) of U.S. Provisional Patent Application Ser. No. 61/643,634 titled Motion Detection System and Associated Methods filed May 7, 2012, the content of which is incorporated in its entirety herein.

FIELD OF THE INVENTION

The present invention relates to the field of lighting systems and, more specifically, to lighting systems that can emit and sense light within a wavelength range, and associated methods.

BACKGROUND OF THE INVENTION

This background information is provided to reveal information believed by the applicant to be of possible relevance to the present invention. No admission is necessarily intended, nor should be construed, that any of the preceding information constitutes prior art against the present invention.

Lighting systems have been used to illuminate spaces since the invention of fire. Over the years, technology has brought us the incandescent light, which produces light by heating a metal filament, causing it to radiate heat. Although the incandescent light is capable of illuminating an area, it does so with little efficiency.

Lighting systems that include a conversion material may conveniently allow the conversion of a source light emitted from a light source into light of a different wavelength range. Often, such a conversion may be performed by using a luminescent, fluorescent, or phosphorescent material. The wavelength conversion materials may sometimes be included in the bulk of another material, applied to a lens or optic, or otherwise located in line with the light emitted from light source. In some instances the conversion material may be applied to the light source itself. A number of disclosed inventions exist that describe lighting devices that utilize a conversion material applied to an LED to convert light with a source wavelength range into light with a converted wavelength range.

Sensors may additionally be included in lighting systems to control operation upon the sensed compliance with a desired event. As an example, sensors may detect the presence of movement in a space to control illumination. However, including sensors may increase the number of parts and complexity required to build the lighting system, thereby increasing its manufacturing cost.

There exists a need for a wavelength lighting system that can emit an illuminating light and sense an object within a field of view of the wavelength lighting system by altering its operational state between various portions of the duty cycle.

SUMMARY OF THE INVENTION

With the foregoing in mind, embodiments of the present invention are related to a wavelength sensing lighting system that can emit illuminating light and sense environmental light during portions of the duty cycle. Additionally, according to an embodiment of the present invention, the lighting system may advantageously analyze the sensed environmental light to determine the presence or absence of an object within the field of view of the wavelength sensing lighting system.

The present invention may provide a lighting system which, in one embodiment, may include a light source to emit illuminating light and sense environmental light from an environment and a wavelength conversion material between the light source and the environment to absorb at least part of a source light and emit a converted light. The source light may be received and absorbed by the wavelength conversion material, and the converted light may be emitted by the wavelength conversion material.

The light source may be included in an array to be selectively enabled and disabled by the controller. The array may include a plurality of light sources. A plurality of light sources may be included within an array, each of which may be sensitive to a wavelength respective to each light source, thus providing the array sensitivity to one or more wavelength. The plurality of light sources may be selectively operable substantially simultaneously, as well as individually. The plurality of light sources may selectively emit the illuminating light in a plurality of directions and may selectively receive the environmental light from the plurality of directions.

Each of the plurality of light sources in the array may be selectively operable between a sensing operation and an emitting operation. The sensing operation may be defined by the light source sensing the environmental light, and the emitting operation being defined by the light source emitting the illuminating light. The controller may selectively operate the light source between the passive operation and the active operation.

Some embodiments of the invention may provide a lighting system for detecting movement. The lighting system may include a first set of light emitting diodes (LEDs), a second set of LEDs, a voltage sensor coupled to an LED of the second set of LEDs defining a coupled LED, and a controller functionally coupled to each of the first and second sets of LEDs. The controller may be configured to continuously operate the first set of LEDs to emit light within a field of view of the first and second sets of LEDs. Furthermore, the controller may be configured to operate the second set of LEDs in alternating active and passive states. Additionally, the controller may be configured to operate the second set of LEDs to emit light in the active state. Yet further, the controller may be configured to operate the second set of LEDs to not emit light in the passive state and maintain a baseline voltage. The voltage sensor may be configured to monitor the voltage of the coupled light emitting element during the passive state. Additionally, the coupled light emitting element may be configured to vary the voltage there across upon incidence of light reflected by a target. A change of voltage from the baseline voltage in the coupled light emitting element during the passive state may indicate the detection of a target within the field of view of the first and second sets of LEDs.

A method of the present invention may include detecting an object within the field of view of a lighting system comprising a first set of lighting element, a second set of lighting elements, a controller functionally coupled to each of the first and second sets of LEDs, and a voltage sensor coupled to at least one of the second set of LEDs, wherein the light emitting element that the voltage meter is coupled to is configured to vary its voltage, when in a non-emitting state, proportionally to light that is incident thereupon. The method may include operating the first set of LEDs to continuously emit light, operating the second set of LEDs to alternate between an active state and a passive state. And determining a voltage across the coupled light emitting element. The second set of LEDs may be emitting during the active state, and the controller may operate the second set of LEDs to not emit light in the passive state and maintain a baseline voltage. A change of voltage from the baseline voltage in the coupled light emitting element during the passive state may indicate the detection of a target within the field of view of the first and second sets of LEDs.

The controller may be operatively connected to a voltage sensor to sense an open circuit voltage across the light emitting diode sensing the environmental light. The controller may analyze information received from the voltage sensor to determine characteristics about the background light. The controller may maintain a running baseline for the background light being received by the LED. Furthermore, the controller may detect a change in the information received from the voltage sensor that may indicate the presence of an object within the field of view of the lighting system.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

An embodiment of the invention, as shown and described by the various figures and accompanying text, provides a wavelength sensing lighting system substantially as disclosed in U.S. patent application Ser. No. 13/269,222, entitled Wavelength Sensing Light Emitting Semiconductor and Associated Methods, filed Oct. 7, 2011, which is herein incorporated by reference in its entirety.

Figure 1:
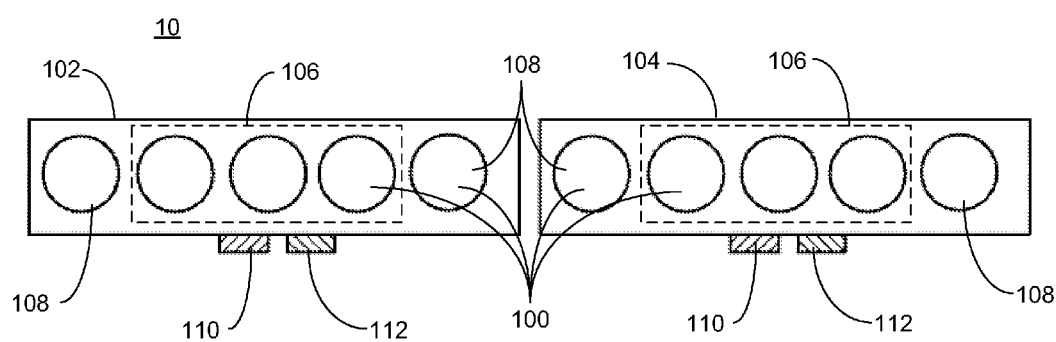
FIG. 1 is a side view of a lighting system according to an embodiment of the present invention.

According to one embodiment of the invention illustrated in FIG. 1, a lighting system 10 is provided. The lighting system 10 may include an array of light emitting elements, such as light emitting semiconductors. More specifically, the light emitting elements may be light emitting diodes 100 (LEDs). The array of LEDs may be configured according to any shape or configuration desired. In the present embodiment, the array of light emitting elements includes a series of one-foot sections 102, 104 of LEDs. The number and arrangement of sections of LEDs may be configured to accommodate the space and desired outcomes of a given implementation. In the present embodiment, the sections 102, 104 of LEDs are arranged end-on-end.

Each section of LEDs may include any number of LEDs. In the present embodiment, each section of LEDs includes 5 LEDs. Furthermore, each section of LEDs may include two sets of LEDs. A first set of LEDs 106 may be LEDs that are continuously driven by a controller. Continuously driven LEDs are those whose sole function are to provide light and do not sense environmental light. In the present embodiment, the first set of LEDs 106 includes 18 LEDs.

A second set of LEDs 108 may be LEDs that have a switched operation. In switched operation, each LED of the second set of LEDs 108 is switched between an active and a passive operating mode. In the active operating mode, each of the LEDs emits light substantially as the LEDs of the first set of LEDs 106. In the passive operating mode, the LEDs are turned off, which is to say the voltage being applied to them is reduced below an operational threshold, thus de-illuminating the LED. The length of each operating mode and the frequency with which the operating mode is switched may vary. For example, and not by way of limiting, the LEDs of the second set of LEDs 108 may be in the active operating mode for 98% of a duty cycle, in the passive mode for 2% of the duty cycle, and the duty cycle may be repeated at a rate of 25 cycles per seconds. Duty cycles of greater or lesser length, and differing lengths of passive and active operating modes are contemplated and within the scope of the invention.

A controller 110 (or microcontroller) may be functionally coupled to each LED of each section of LEDs. Specifically, the controller 110 may be functionally coupled to each of the first and second sets of LEDs. The controller 110 may control the operation of the second set of LEDs, switching the constituent LEDs between active and passive operating modes. More specifically, a plurality of the LEDs in each array may be switched between an on position and an off position under control of the microcontroller. When in the off position, the LED may be electronically connected to an analog to digital converter which is used to sense the voltage across the momentarily inactive LED. This voltage is dependent on the incident light on the LED, and it increases in a non-linear fashion as the magnitude of the incident light increases.

Accordingly, the lighting system may further include at least one voltage sensor 112. Each LED of the second set of LEDs may have a voltage sensor 112 functionally coupled thereto, such that the voltage sensor 112 may detect changes in voltage across the coupled LED. There may optionally be one voltage sensor functionally coupled with all the LEDs of the second set of LEDs, or each LED of the second set of LEDs may have a dedicated voltage sensor coupled thereto. Furthermore, each voltage sensor 112 may be functionally coupled with the controller 110 of each section of LEDs.

As data is collected (in real time in some embodiments), the microcontroller maintains a running baseline of the background light being received by the LED. This may be done to be able to compensate for variations in the light received by the sensing LEDs during the course of the observation period. Although movement in front of the sensing LEDs may cause reflections that may affect the light sensed by the sensing LEDs and thus the voltage developed across the LEDs, other factors can also have an effect on the voltage. These factors may, for example, include temperature changes in the environment and light intensity changes due to external factors such as day/night conditions or cloudy/sunny cycles.

The instantaneous voltage measured across a sensing LED may be compared to the baseline, and if a predetermined threshold between the voltages is exceeded, a determination may be made that an object or person has moved within the field of view of the LED array. A counter may be increased every time a new movement is detected. To prevent multiple and incorrect counts from objects whose reflections generate a voltage across the sensing LEDs that is close to the threshold voltage, a hysteresis section may be included in the algorithm. For example, a 1% change in voltage across an LED diode (compared to the baseline voltage) could be construed as occurring as a result of movement. The algorithm will continue to consider the reflection to be present until the voltage drops below 0.5% of the baseline voltage.

The signal detection algorithm may produce a series of ones and zeros, corresponding to instances when reflections beyond the threshold are detected or not respectively. The length of each sequence of 'ones' can be used to measure the duration of the event that resulted in the voltage across the LED exceeding the threshold. Thus, the algorithm can determine if a person walked in front of the LED array without stopping, or is a person stopped for a certain time.

Figure 2:
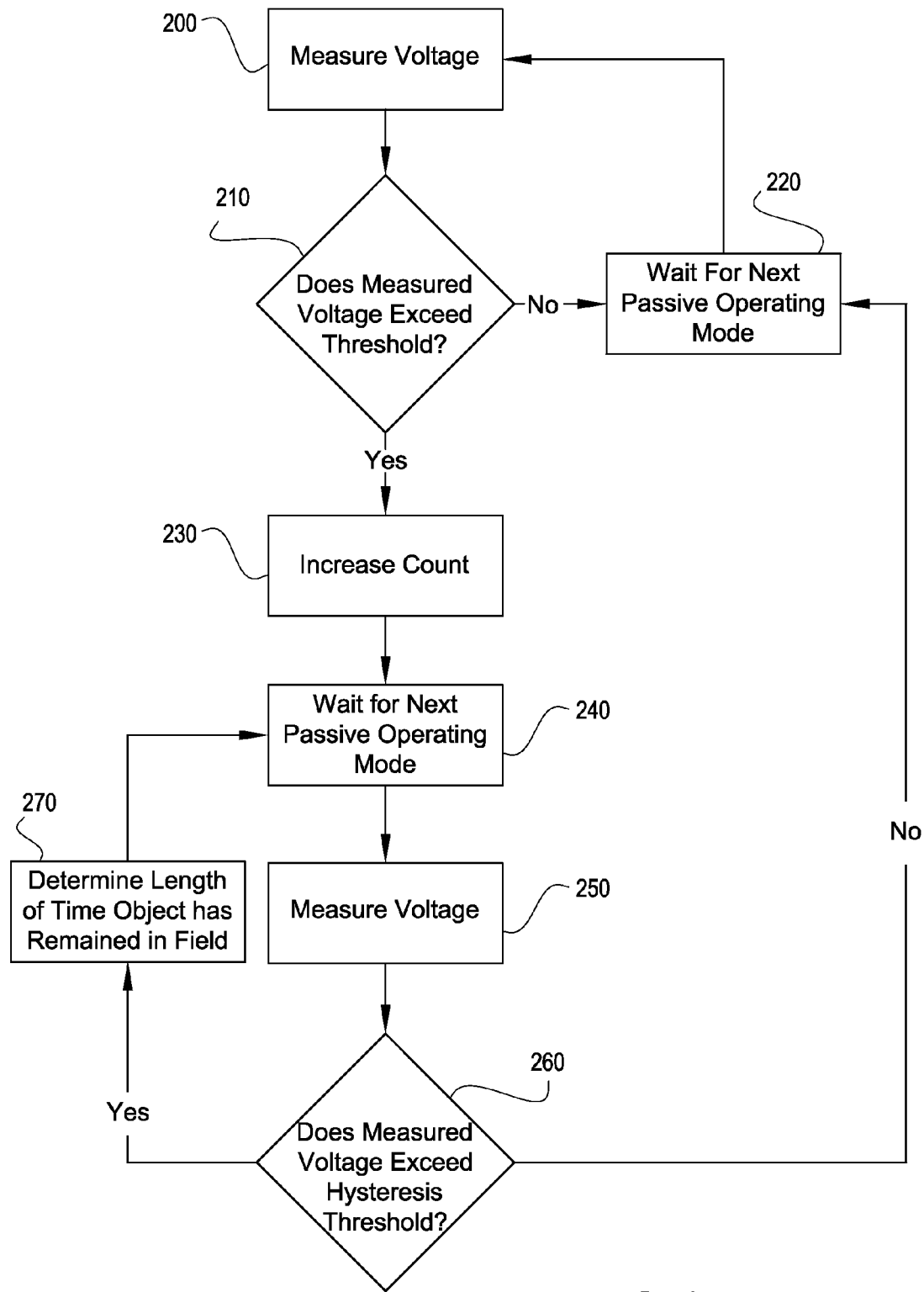
FIG. 2 is a flow chart of the operation of the lighting system of FIG. 1.

The results of the analysis may be displayed in real time, and include a count of the number of events (i.e. the number of people walking in front of the array), and a histogram that can show how long each person stayed in front of the array. For example, in one possible embodiment, the histogram can separate events into four categories:

1. Less than 1 second
2. Between 1 and 3 seconds
3. Between 3 and 6 seconds
4. More than 6 seconds Turning now to FIG. 2, as each LED of the second set of LEDs is switched into the passive operating mode, the voltage sensor may measure the voltage across the LED, as indicated at block 200. Because external sources of voltage have been removed from the LED, any measured voltage will be a function of background light that is incident upon the LED. More specifically, there is directly proportional relationship between the background light incident upon the LED and the voltage measured by the voltage sensor across the LED.

The controller may analyze measurements received from the voltage sensor. As indicated above, one method of analyzing the measurements received from the voltage sensor includes determining a running baseline voltage. The running baseline voltage may indicate a baseline background light that is incident upon the LED. By determining a baseline voltage, the controller may be able to identify when there is a sudden change in the measured voltage, indicating a corresponding change in the background light. Additionally, because the baseline voltage is a running baseline voltage, gradual changes to the background light, such as, for instance, transitions between day and night, or cloud coverage.

Each voltage measurement taken during each passive operating mode of an LED may be compared to the running baseline voltage by the controller. When an object moves into the field of view of the lighting fixture, background light will reflect off the object. The reflection of the background light will cause a change in the background light that is incident upon the LED. The change in background light incident upon the LED will cause a corresponding change in the voltage measured across that LED. The controller may analyze the change in voltage to determine whether an object has been detected.

Determination of whether an object has entered the field of view of an LED may be based upon a change in the voltage across the LED during a passive operating mode above a certain threshold, as indicated at block 210. For example, and not by means of limiting, a voltage increase of 0.5% of the running baseline voltage may be interpreted as indicating the presence of an object within the field of view of the LED. If the controller determines there has not been a change exceeding the threshold voltage change, the controller may wait for the next passive operating mode, according to block 220, before the next voltage measurement may be taken, according to block 200.

The controller may maintain a running count of the number of objects detected within the field of view of the LEDs of each section of LEDs. Each time an object has been detected within the field of view of at least one of the LEDs functionally coupled to the controller, the controller may increase the count, according to block 230.

To prevent multiple and incorrect detections of objects within the field of view that is at or near the threshold voltage, the controller may include a hysteresis function. For example, during a first passive operating mode, a 1.0% increase in voltage may be detected across an LED, where the threshold voltage increase is 0.5%. The controller will increase the count by one, as the measured voltage change exceeds the threshold. The controller may then wait for the next passive operating mode, according to block 240, before measuring the voltage, according to block 250. At the next passive operating mode, a 1.0% change in voltage may again be detected. Most likely, this is not an indication of a second object moving into the field of view, but is instead the same object remaining in the field of view. Therefore, the controller should not increase the count, according with block 260.

The controller may determine the length of time an object remains in the field of view of the section of LEDs. As described hereinabove, an object remaining in the field of view of an LED will cause a continuous change in the voltage measured across the LED during its passive operating mode. So long as the change in voltage does not fall below the hysteresis threshold, the controller will determine that the object previously detected remains within the field of view. For each sequential cycle that the controller indicates the presence of the same object, the controller may determine the length of time an object remained within the field of view of the LED, according to block 270. This determination may be used to characterize the movement of the detected object, i.e. did the object move continuously through the field of view, or did it come to a rest.

The controller may wait for the next passive operating mode, according to block 240, to determine whether the object still remains within the field of view. Accordingly, the hysteresis function will require that the measured voltage must be measured at no more than a hysteresis threshold of a 0.5% change of the baseline voltage must be measured before a second object may be determined to be detected. It is contemplated and included within the scope of the invention that different values for the threshold voltage change and hysteresis threshold voltage change may be employed.

If, at block 260, it is determined that the measured voltage does not exceed the hysteresis voltage, the controller may wait for the next passive operating mode according to block 220.

The controller may be in communication with a computing device external the array. For example, the controller may be in communication with a personal computer or a server. Either the controller or the computing device may categorize the objects detected according to the length of time each object remained within the field of view. For example, in one possible embodiment, the objects may be grouped into those that remained in the field of view for less than one second, between one and three seconds, between three and six second, and more than six second. Furthermore, the results of the analysis may be displayed in real time on the computing device. The results displayed may include, without limitation, the count of objects, and a histogram of the duration of each object.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A lighting system for detecting movement comprising:
a first set of light emitting diodes (LEDs);
a second set of LEDs;
a voltage sensor coupled to an LED of the second set of LEDs defining a coupled LED; and
a controller functionally coupled to each of the first and second sets of LEDs;
wherein the controller is configured to continuously operate the first set of LEDs to emit light within a field of view of the first and second sets of LEDs;
wherein the controller is configured to operate the second set of LEDs in alternating active and passive states;
wherein the controller is configured to operate the second set of LEDs to emit light in the active state
wherein the controller is configured to operate the second set of LEDs to not emit light in the passive state and maintain a baseline voltage;
wherein the voltage sensor is configured to monitor the voltage of the coupled LED during the passive state;
wherein the coupled LED is configured to vary the voltage there across upon incidence of light reflected by a target; and
wherein a change of voltage from the baseline voltage in the coupled LED during the passive state indicates the detection of a target within the field of view of the first and second sets of LEDs.

2. A lighting system according to claim 1 wherein the controller is configured to include a threshold voltage; and wherein the controller is configured to interpret a change in the voltage across the coupled LED beyond the threshold voltage as an indication of the detection of a target within the field of view of the first and second sets of LEDs.

3. A lighting system according to claim 2 wherein the threshold voltage is about a 1 percent difference from the baseline voltage.

4. A lighting system according to claim 2 where in the controller is configured to include a hysteresis range; wherein the controller is configured to interpret a change in voltage from the baseline voltage beyond the threshold voltage as an indication of the detection of a target within the field of view of the first and second sets of LEDs; and wherein the controller is configured to indicate the continued detection of a target within the field of view when the change in voltage drops within the threshold voltage but remains within a hysteresis range.

5. A lighting system according to claim 4 wherein the hysteresis range is from about a 0.5 percent difference from the baseline voltage to about a 1 percent difference the baseline voltage.

6. A lighting system according to claim 1 wherein the active state is associated with a duty cycle of the second set of LEDs; and wherein the duty cycle for the second set of LEDs is about 98%.

7. A lighting system according to claim 1 wherein the controller is configured to adjust the baseline voltage responsive to gradual changes in the voltage detected across the coupled LED.

8. A lighting system according to claim 1 wherein the controller is programmable to determine the length of time a detected target remained within the field of view of the first and second LEDs.

9. A lighting system according to claim 8 further comprising a computing device positioned in communication with the controller; wherein the computing device is configured to categorize the length of time the target is detected within the field of view of the first and second sets of LEDs; and wherein the computing device is configured to display each of the categories.

10. A system according to claim 1 further comprising a network interface device positioned in communication with a network; wherein the controller is configured to transmit data related to the detection of the target within the field of view of the first and second sets of LEDs to a computerized device across the network.

11. A method of detecting an object within the field of view of a lighting system comprising a first set of lighting element, a second set of lighting elements, a controller functionally coupled to each of the first and second sets of LEDs, and a voltage sensor coupled to at least one LED of the second set of LEDs, wherein the LED that the voltage sensor is coupled to is configured to vary its voltage, when in a non-emitting state, proportionally to light that is incident thereupon, the method comprising the steps of:
operating the first set of LEDs to continuously emit light;

operating the second set of LEDs to alternate between an active state and a passive state; and determining a voltage across the coupled LED;

wherein the second set of LEDs are emitting during the active state;

wherein the controller operates the second set of LEDs to not emit light in the passive state and maintain a baseline voltage; and wherein a change of voltage from the baseline voltage in the coupled LED during the passive state indicates the detection of a target within the field of view of the first and second sets of LEDs.

12. A method according to claim 11 further comprising the step of determining whether the change of voltage from the baseline voltage is at or above a threshold voltage; wherein a change of voltage from the baseline voltage at or above a threshold voltage indicates the detection of a target within the field of view of the first and second sets of LEDs.

13. A method according to claim 12 wherein the controller is configured to include a hysteresis range, the method further comprising the steps of:

detecting a drop in the change of voltage below the threshold voltage;

determining whether the change of voltage is within the hysteresis range;

wherein the determination that the change of voltage is within the hysteresis range indicates the continued detection of the target within the field of view.

14. A method according to claim 11 further comprising the step of adjusting the baseline voltage responsive to a gradual change detected across the coupled LED.

15. A lighting system for detecting movement comprising:
a first set of LEDs;
a second set of LEDs comprising an LED;
a voltage sensor coupled to at least one LED of the second set of LEDs;
a controller functionally coupled to each of the first and second sets of LEDs;
wherein the controller is configured to continuously operate the first set of LEDs to emit light within a field of view of the first and second sets of LEDs;
wherein the controller is configured to operate the second set of LEDs in alternating active and passive states;
wherein the controller is configured to operate the second set of LEDs to emit light in the active state wherein the controller is configured to operate the second set of LEDs to not emit light in the passive state and maintain a baseline voltage;

wherein the voltage sensor is configured to monitor the voltage of the coupled LED during the passive state;

wherein the coupled LED is configured to vary the voltage there across upon incidence of light reflected by a target;

wherein the controller is configured to include a threshold voltage; and wherein the controller is configured to interpret a change in the voltage across the coupled LED beyond the threshold voltage as an indication of the detection of a target within the field of view of the first and second sets of LEDs.

16. A lighting system according to claim 15 where in the controller is configured to include a hysteresis range; wherein the controller is configured to interpret a change in voltage from the baseline voltage beyond the threshold voltage as an indication of the detection of a target within the field of view of the first and second sets of LEDs; and wherein the controller is configured to indicate the continued detection of a target within the field of view when the change in voltage drops within the threshold voltage but remains within a hysteresis range.

17. A lighting system according to claim 15 wherein the active state is associated with a duty cycle of the second set of LEDs; and wherein the duty cycle for the second set of LEDs is about 98%.

18. A lighting system according to claim 15 wherein the controller is configured to adjust the baseline voltage responsive to gradual changes in the voltage detected across the coupled LED.

19. A lighting system according to claim 15 wherein the controller is programmable to determine the length of time a detected target remained within the field of view of the first and second LEDs.

20. A lighting system according to claim 19 further comprising a computing device positioned in communication with the controller; wherein the computing device is configured to categorize the length of time the target is detected within the field of view of the first and second sets of LEDs; and wherein the computing device is configured to display each of the categories.

* * * * *